United States Patent
Mao et al.

[11] Patent Number: 5,964,902
[45] Date of Patent: Oct. 12, 1999

[54] USE OF $B_2O_3$ ADDITIVE IN NON-AQUEOUS RECHARGEABLE LITHIUM BATTERIES

[75] Inventors: Huanyu Mao, Burnaby; Jan Naess Reimers, Maple Ridge, both of Canada

[73] Assignee: NEC Moli Energy (Canada) Limited, Maple Ridge, Canada

[21] Appl. No.: 08/815,946

[22] Filed: Mar. 13, 1997

[30] Foreign Application Priority Data

May 3, 1996 [CA] Canada ................................. 2175755

[51] Int. Cl.⁶ .................................................. H01M 6/16
[52] U.S. Cl. ......................... 29/623.1; 429/332; 429/341
[58] Field of Search .................................. 429/194, 197, 429/248, 332, 341; 29/623.1

[56] References Cited

U.S. PATENT DOCUMENTS

| | | | |
|---|---|---|---|
| 4,654,280 | 3/1987 | Bailey | 429/194 |
| 5,168,019 | 12/1992 | Sugeno | 429/194 |
| 5,578,395 | 11/1996 | Yoshimura et al. | 429/197 |

FOREIGN PATENT DOCUMENTS

| | | |
|---|---|---|
| 2150877 | 6/1995 | Canada . |
| 1-200572 | 11/1989 | Japan . |
| 5-266880 | 10/1993 | Japan . |
| 6-163046 | 6/1994 | Japan . |
| 7-142055 | 6/1995 | Japan . |

OTHER PUBLICATIONS

Matsuda et al., *Journal of Power Sources*, 54(2), 301–305 (Apr. 1995).
Mater. Sci. Eng., B, B14(1), 121–6, 1992 (month unknown).

*Primary Examiner*—Stephen Kalafut
*Attorney, Agent, or Firm*—Synnestvedt & Lechner LLP

[57] ABSTRACT

The loss in delivered capacity upon cycling non-aqueous rechargeable lithium batteries can be reduced by incorporating a small amount of $B_2O_3$ additive in the electrolyte. The $B_2O_3$ additive is preferably dissolved in the electrolyte prior to assembling the battery. The invention is particularly suited to lithium ion rechargeable batteries.

19 Claims, 4 Drawing Sheets

USE OF $B_2O_3$ ADDITIVE IN NON-AQUEOUS RECHARGEABLE LITHIUM BATTERIES

FIELD OF THE INVENTION

This invention pertains to non-aqueous rechargeable lithium batteries and to methods for improving the performance thereof. Specifically, it pertains to the use of $B_2O_3$ in lithium batteries as a means for improving the capacity delivered from such ion batteries after extended cycling.

BACKGROUND OF THE INVENTION

Many varied types of non-aqueous rechargeable lithium batteries are used commercially for consumer electronics applications. Typically, these batteries employ a lithium insertion compound as the active cathode material, a lithium compound of some sort (eg. pure lithium metal, lithium alloy, or the like) as the active anode material, and a non-aqueous electrolyte. An insertion compound is a material that can act as a host solid for the reversible insertion of guest atoms (in this case, lithium atoms).

Lithium ion batteries use two different insertion compounds for the active cathode and anode materials. Currently available lithium ion batteries are high voltage systems based on $LiCoO_2$ cathode and coke or graphite anode electrochemistries. However, many other lithium transition metal oxide compounds are suitable for use as the cathode material, including $LiNiO_2$ and $LiMn_2O_4$. Also, a wide range of carbonaceous compounds is suitable for use as the anode material. These batteries employ non-aqueous electrolytes comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

The excellent reversibility of lithium insertion makes it possible for lithium ion batteries to achieve hundreds of battery cycles. Still, a gradual loss of lithium and/or buildup of impedance can occur upon such extended cycling for various reasons. This in turn typically results in a gradual loss in delivered capacity with cycle number. Researchers in the art have devoted substantial effort to reducing this loss in capacity. For instance, co-pending Canadian patent application serial number 2,150,877, filed Jun. 2, 1995, and titled 'Use of $P_2O_5$ in Non-aqueous Rechargeable Lithium Batteries' discloses a means for reducing this loss which involves exposing the electrolyte to $P_2O_5$. However, $P_2O_5$ shows at best only limited solubility in typical non-aqueous electrolytes and can be somewhat awkward to use in practice. Alternatives which are soluble may be more convenient, but it is unclear why such exposure is effective and hence what compounds might serve as effective alternatives.

Boron oxide ($B_2O_3$) is a common chemical compound that is extensively used in the glass industry, and its properties are well known. $B_2O_3$ has also been used in the lithium battery industry for a variety of reasons. In most cases, the $B_2O_3$ is used as a precursor or reactant to prepare some other battery component. For instance, in Japanese published patent application 06-163046, M. Terasaki et al. use $B_2O_3$ as a reactant to prepare a desired cathode compound. In Japanese published patent application 05-266880, Y. Mifuji et al. use $B_2O_3$ as a reactant to prepare a desired anode compound. In Mater. Sci. Eng., B, B14(1), 121–6, 1992, C. Julien et al. use $B_2O_3$ as a precursor to prepare solid or gel electrolytes for solid state lithium batteries.

In Japanese published patent application 07-142055, T. Maeda et al. show that lithium batteries can show improved stability characteristics to high temperature storage when using lithium transition metal oxide cathodes which contain $B_2O_3$. However, there is no suggestion in the Maeda et al. application that improved battery characteristics might be obtained by having $B_2O_3$ additive dissolved in the electrolyte or of possible ways of achieving this. Also, there is no suggestion in the Maeda et al. application that an advantage of employing a $B_2O_3$ additive in the electrolyte could be to reduce the rate of capacity loss with cycling.

SUMMARY OF THE INVENTION

Rechargeable batteries exhibit a loss in delivered capacity as a function of the number of charge/discharge cycles. Herein, the fractional loss of capacity per cycle is referred to as the capacity fade rate. The instant invention includes non-aqueous rechargeable lithium batteries having improved fade rates and methods for achieving the reduced fade rate. Non-aqueous rechargeable lithium batteries generally comprise a lithium insertion compound cathode, a lithium compound anode, and a non-aqueous electrolyte comprising a lithium salt dissolved in a non-aqueous solvent. We have discovered that dissolving a small amount of $B_2O_3$ additive in the solvent of such batteries can result in improved fade rate characteristics, that is, a reduction in the capacity fade rate.

A preferred method for obtaining a battery having $B_2O_3$ additive in the electrolyte is simply to dissolve an amount of $B_2O_3$ additive into the solvent prior to assembling the battery, that is, preparing the electrolyte/additive solution separate from the rest of the assembly. We have found that an amount of dissolved $B_2O_3$ ranging from about 0.1% to 1.0% weight of the weight of the electrolyte can be effective in improving capacity fade rate. Most preferably, the amount of dissolved $B_2O_3$ additive is sufficiently small that the thermal stability threshold of the battery remains essentially unchanged. Thus, the relative safety of the battery is not compromised by the inclusion of the $B_2O_3$ additive. An amount of dissolved $B_2O_3$ ranging from about 0.1% to less than about 0.6% weight of the weight of the electrolyte can be effective in improving capacity fade rate in certain battery constructions without compromising fundamental battery safety.

In order to prevent discoloration or decomposition of the electrolyte, the electrolyte can be cooled during the $B_2O_3$ dissolving, such as at a temperature of about $-10°$ C.

With the $B_2O_3$ improved fade rates can be achieved for batteries employing conventional lithium ion battery electrochemistries. Thus, the cathode can be a lithium transition metal oxide, in particular, $LiCoO_2$ or $LiMn_2O_4$. The anode can be a carbonaceous insertion compound anode. The electrolyte can contain $LiPF_6$ salt dissolved in an organic carbonate solvent, in particular mixtures containing propylene carbonate, ethylene carbonate, ethyl methyl carbonate, and/or diethyl carbonate solvents.

An alternative method for producing a battery with $B_2O_3$ additive dissolved in the electrolyte is to disperse powdered $B_2O_3$ in the anode such that the powder is accessed by and dissolved in the solvent during assembly of the battery. As a further alternative, powdered $B_2O_3$ additive can be dispersed in the separator such that the $B_2O_3$ additive is accessed by and dissolved in the solvent during assembly of the battery. Finally, powdered $B_2O_3$ additive can be dispersed at any other location that is remote from the cathode, anode, and separator as long as the $B_2O_3$ additive is accessed by and dissolved in the solvent during assembly of the battery.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
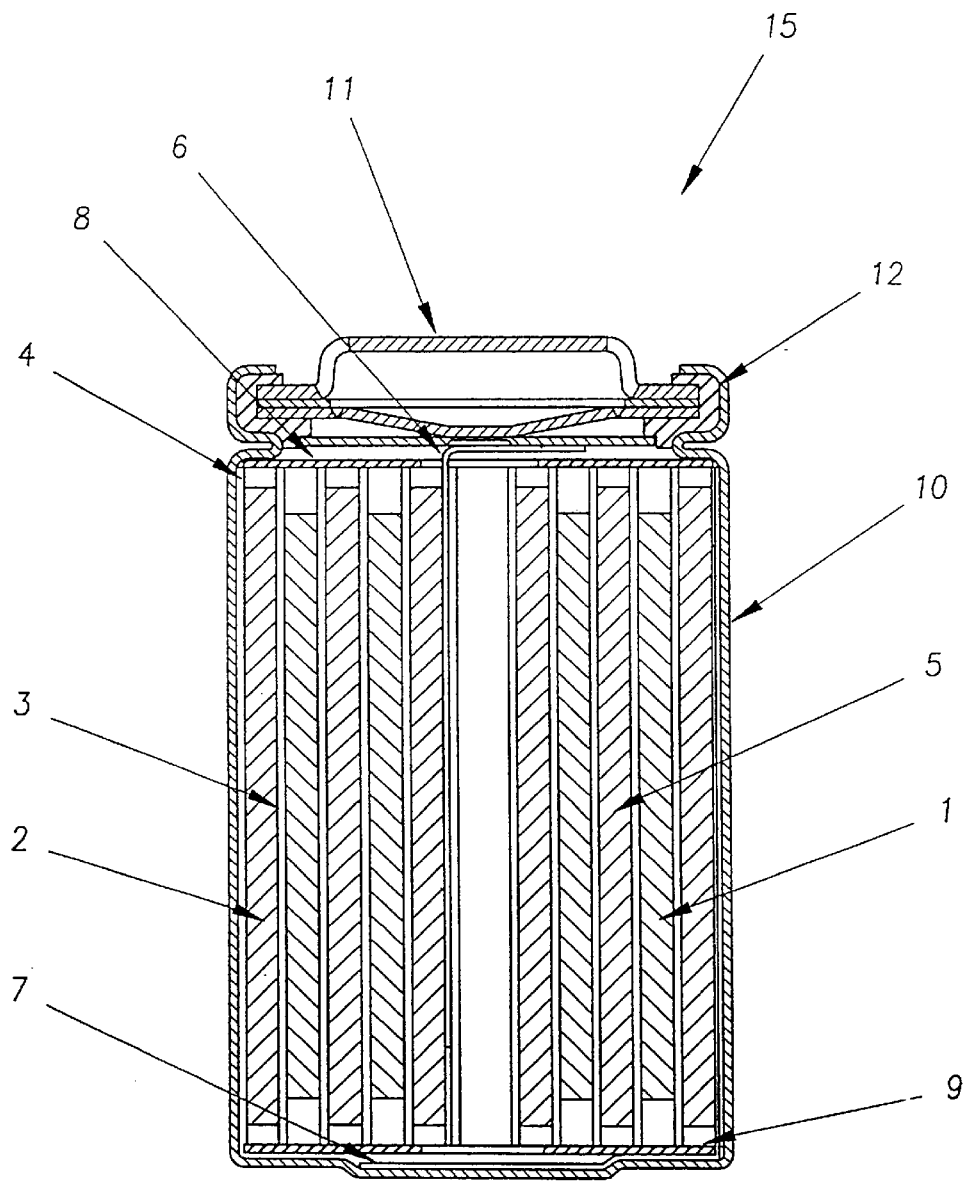
FIG. 1 depicts a cross-sectional view of a preferred embodiment of a cylindrical spiral-wound lithium ion battery.

We have discovered unexpectedly that the capacity fade rate characteristic of non-aqueous lithium rechargeable batteries in general can be improved by dissolving a small amount of $B_2O_3$ additive in the electrolyte. However, we have also discovered that some tradeoffs in other battery characteristics may occur with the use of such an additive. Thus, we have found that a balance must be struck between these characteristics when selecting the amount of $B_2O_3$ additive to use.

Typically, a non-aqueous lithium rechargeable battery employs a lithium insertion compound as the cathode and one of a variety of lithium compounds as the anode. Possible lithium compounds include lithium metal, lithium alloys, and lithium insertion compounds. Preferred embodiments are lithium ion batteries wherein the anode is also a lithium insertion compound. Currently, the majority of commercial lithium ion batteries employ $LiCoO_2$ cathodes and carbonaceous anodes.

Preferred electrolytes for lithium ion batteries comprise $LiPF_6$ salt dissolved in a mixture of non-aqueous organic carbonate solvents (such as propylene carbonate, ethylene carbonate, ethyl methyl carbonate, and/or diethyl carbonate). This choice of salts can result in a safer, more stable, electrolyte than other salt choices.

We have discovered that if only a small amount (circa 1% by weight) of $B_2O_3$ is dissolved in the battery electrolyte, the other bulk characteristics of the electrolyte can remain largely unaffected. However, we have also determined that the presence of $B_2O_3$ in the electrolyte can result in an increase in the irreversible capacity loss experienced during the first charging of such batteries. Also, we have found that the use of too much $B_2O_3$ can adversely affect the thermal stability threshold of such batteries. Based on our discovery, it is apparent that an excessive amount of dissolved $B_2O_3$ could be expected to adversely affect electrolyte conductivity and hence battery rate capability. Thus, it is important not only to determine the capacity fade rate as a function of amount of additive in any particular embodiment, but also to determine the effects of amount of additive on these other important battery characteristics. In each case, it is advisable that some non-inventive characterization trials be performed in order to arrive at a sensible tradeoff between fade rate improvement and these other characteristics.

The invention relates to methods for obtaining battery constructions with $B_2O_3$ dissolved in the electrolyte to improve capacity fade rate. These methods are suited to various battery configurations including prismatic formats or miniature coin cells. A preferred conventional construction for a lithium ion type product is depicted in the cross-sectional view of a spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired such as a combination safety vent and pressure operated disconnect device. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous separator, anode and cathode spaces in the jelly roll 4.

At this point of manufacture, the battery is in a fully discharged state. Generally, an electrical conditioning step, involving at least a single complete recharge of the battery, is performed as part of the overall assembly. One of the reasons for so doing is that some initial irreversible processes take place on this first recharge. For instance, a small amount of lithium is irreversibly lost during the first lithiation of the carbonaceous anode.

Lithium ion batteries of the invention additionally have $B_2O_3$ dissolved in the electrolyte in order to improve performance by reducing the fade rate. The $B_2O_3$ dissolving step can be accomplished in a variety of simple ways. The most straightforward and thus the preferred method simply involves dissolving a suitable amount of $B_2O_3$ powder in the electrolyte prior to filling the battery.

Alternatively, $B_2O_3$ powder may be mixed in with the anode slurry prior to coating an anode foil substrate.

However, $B_2O_3$ is hygroscopic and readily reacts with water to make boric acid, which is undesirable. Since it is generally easier to avoid exposing the electrolyte to wet air than it is to avoid exposing the manufactured anode foils, this alternative method is less preferred. Additionally, the $B_2O_3$ incorporated in the anode coating must be accessible to the electrolyte after filling (ie. not encapsulated by the binder). And, after dissolution, voids are created where the $B_2O_3$ was originally incorporated. Thus, such an anode coating must be engineered such that, after dissolution, these voids do not interfere with the mechanical integrity or the electrical connections between coated active anode particles.

As a further alternative, the dissolving step of the invention can be achieved by incorporating $B_2O_3$ powder in the separator to be used in the batteries. Again, as long as the powder is accessible to the electrolyte, it will dissolve therein after the battery is filled. In fact, incorporating suitably sized powders into a plastic precursor film is one common method of making the microporous films commonly used as separators in lithium ion batteries. The powders can be removed by solvent extraction or, instead, the film can be stretched so as to form voids around the incorporated particles. Accordingly, it may actually be preferred overall to use an appropriate amount of suitably sized $B_2O_3$ powder in order to make the battery separator. Careful coordination between separator supply and battery manufacture would obviously be essential though.

Finally, we advise that any method of incorporating $B_2O_3$ powder at any location in the battery where it is accessed by and thus dissolves uniformly throughout the electrolyte would be effective. In principle, the location can be remote from both electrodes and separator. However, the battery construction/configuration must be such that the $B_2O_3$ can be uniformly dispersed in solution over a timescale that is practical for manufacturing purposes. It would, for example, take a long period of time for dispersion to occur if the powder were located below the jelly roll 4 in the conventional construction of a lithium ion battery shown in FIG. 1.

We have discovered surprisingly and beneficially that the advantages of the invention can be achieved using only modest amounts of $B_2O_3$ additive. In the examples which follow, we have obtained desirable results by using of the order of 1% $B_2O_3$ additive by weight in the electrolyte. As mentioned above, some tradeoffs in other desirable battery characteristics can be expected if excessive amounts of $B_2O_3$ are employed. For instance, care must be taken not to unacceptably alter the thermal stability threshold of the battery by using this additive. Also, care must be taken not to unacceptably increase the irreversible capacity loss experienced in lithium ion batteries by using this additive. We recommend that some straightforward non-inventive quantification trials should be conducted in order to select an appropriate amount of $B_2O_3$ to use.

At this time, the reason for the fade rate improvement using $B_2O_3$ according to the method of the invention is unclear. Without wishing to be adversely bound by theory, but as a possible aid to others in conducting and understanding the invention, a possible explanation could be that the $B_2O_3$ additive inhibits the decomposition of electrolyte at one or both electrodes in a lithium battery. This decomposition not only consumes some active lithium, but also results in the formation of decomposition products which, in turn, may coat the electrode material or otherwise adversely impede ionic transport thereby resulting in an increase in battery impedance.

The following Examples are provided to illustrate certain aspects of the invention but should not be construed as limiting in any way. 18650 size cylindrical batteries (18 mm diameter, 650 mm height) were fabricated as described in the preceding and shown generally in FIG. 1. Cathodes 1 comprised a mixture of active cathode powder, a carbonaceous conductive dilutant, and polyvinylidene fluoride (PVDF) binder in a weight ratio of either 91%, 6%, and 3% respectively for $LiCoO_2$ based batteries or 89%, 7% and 4% respectively for $LiMn_2O_4$ based batteries, uniformly coated on both sides of a thin aluminum foil about 5.8 cm by 55 cm in dimension. Anodes 2 were made using a mixture of a spherical graphitic powder plus Super S (trademark of Ensagri) carbon black and PVDF binder in a weight ratio of about 88%, 2%, and 10% respectively that was uniformly coated on thin copper foil with dimensions to match the cathode. The separators 3 were formed from Celgard™ 2502 microporous polypropylene film for the $LiCoO_2$ based batteries and a polyethylene film made by HiPore for the $LiMn_2O_4$ batteries. The electrolytes 5 employed were solutions of 1M $LiPF_6$ salt dissolved in different organic carbonate solvent mixtures. Approximately 5 cc of electrolyte was used in each battery.

For electrical testing, batteries were thermostatted at $21 \pm 1°$ C. For $LiCoO_2$ based batteries, cycling was performed using a current limited, constant voltage charge (1 A maximum, 4.1 volts) for 2.5 hours and a constant 1.5 amp current discharge to a 2.5 volt cutoff. Every 20 cycles, a prolonged charge was performed for purposes of observing any buildup in battery impedance. The prolonged charge consisted of a series of stepwise constant current charges to a 4.1 V cutoff with a 1 minute rest period between steps. The initial current was 1 A and the current of each subsequent step was reduced by ½ for a total of 7 steps. The difference between the usual discharge capacity and the discharge capacity following this prolonged charge is indicative of battery impedance on charging. It is therefore possible to get a qualitative idea of how much of the loss in battery discharge capacity is simply due to a buildup in impedance and how much is due to an actual loss of cycled lithium. A decrease in the usual discharge capacity includes both effects, while a decrease in capacity following these prolonged charges mainly shows effects due to actual loss of lithium.

Comparative cycling tests were performed on $LiMn_2O_4$ based batteries except that a 4.2 volt upper limit was used on charge and the normal discharge current was a constant 1 A.

COMPARATIVE EXAMPLE 1

Figure 2:
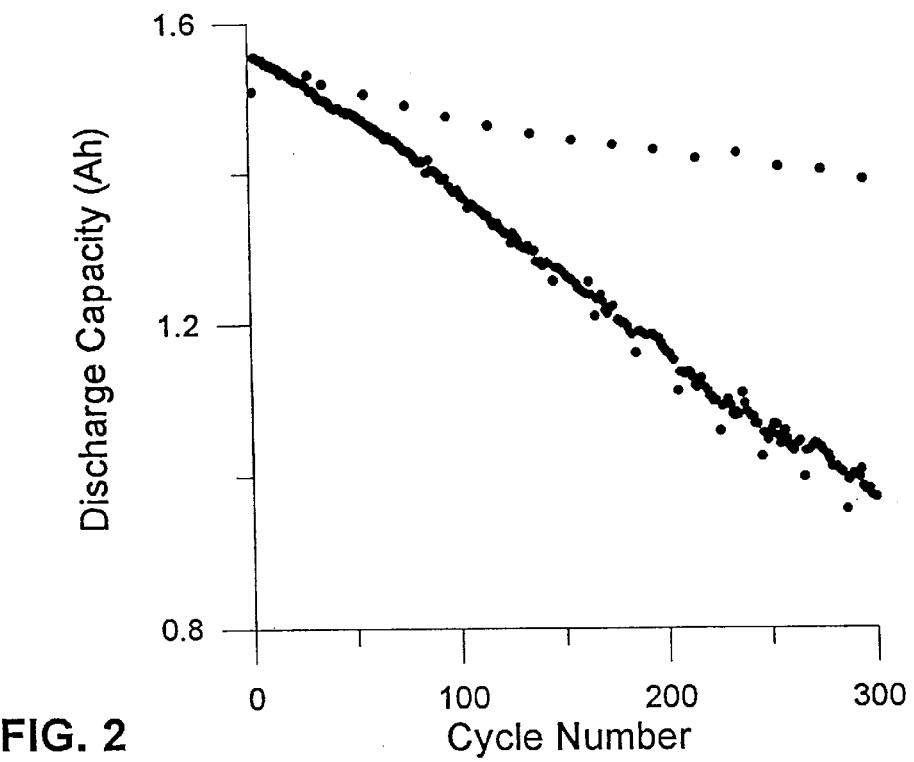
FIG. 2 shows the capacity versus cycle number data for a representative battery of Comparative Example 1 comprising 0% wt. $B_2O_3$ in the electrolyte.

Two $LiCoO_2$ 18650 batteries were constructed using an electrolyte comprising a mixture of ethylene carbonate (EC), ethyl methyl carbonate (EMC), and diethyl carbonate (DEC) solvents in a volume ratio of 30/50/20 respectively. The batteries were then cycled as described above. FIG. 2 shows the capacity versus cycle number data for a representative battery. As can be seen in this Figure, the discharge capacity following the usual 2.5 hour charge decreases significantly while the discharge capacity following the prolonged charges (every 20 cycles) (shown by the upper row of dots of lesser slope) does not decrease so rapidly. Thus, these batteries show a significant capacity fade rate that appears to be due to a buildup in battery impedance.

INVENTIVE EXAMPLE 1

Two $LiCoO_2$ 18650 batteries were constructed as in Comparative Example 1 except that $B_2O_3$ additive was dissolved in the electrolyte prior to assembly. The boron oxide ($B_2O_3$) was first sieved through a 120 mesh screen and then added slowly to the electrolyte similar to that of Comparative Example 1 such that 1% by weight of the resulting electrolyte mixture was $B_2O_3$. During the adding/dissolving steps, the mixture was cooled to about $-10°$ C. to prevent discoloration of the electrolyte.

Figure 3:
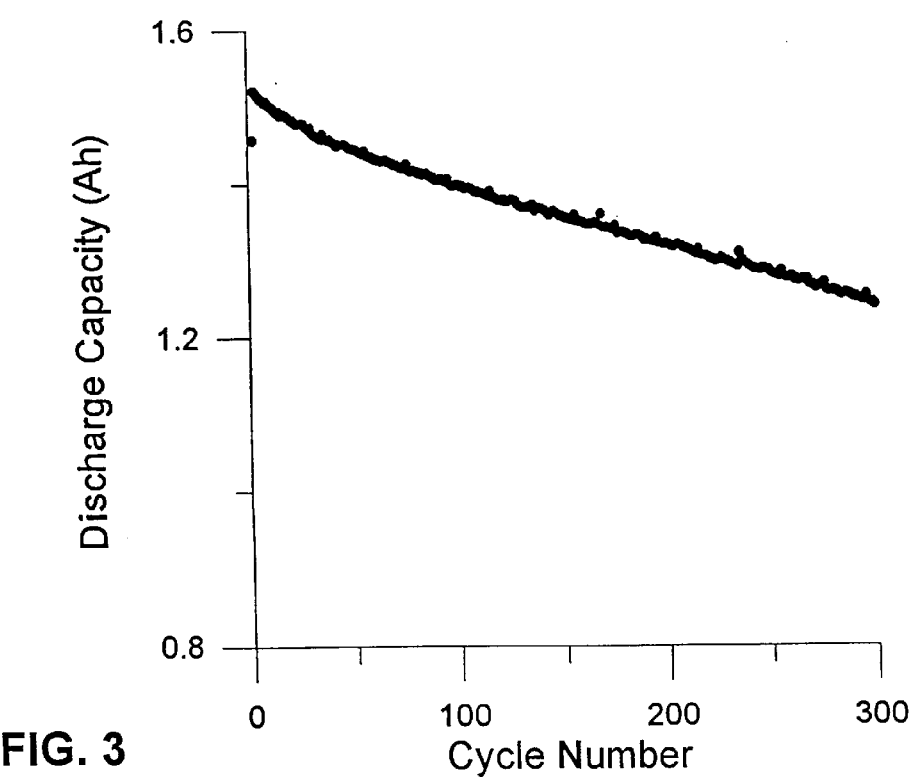
FIG. 3 shows the capacity versus cycle number data for a representative battery of Inventive Example 1 comprising 1% wt. $B_2O_3$ in the electrolyte.

The batteries were then cycled as above. FIG. 3 shows the capacity versus cycle number data for a representative battery with 1% weight $B_2O_3$ in the electrolyte. This battery shows a marked improvement in capacity fade rate over that of Comparative Example 1 above. A significant buildup in impedance is not evident based on the comparison in capacities following the usual and the prolonged charges. However, a small increase in the irreversible loss of lithium during the first conditioning charge is evident and thus the battery capacity over the first few cycles is slightly less than that of Comparative Example 1.

INVENTIVE EXAMPLE 2

A series of $LiCoO_2$ 18650 batteries was constructed as in Inventive Example 1 above except that the electrolyte comprised a mixture of propylene carbonate (PC), EC, and EMC solvents in a volume ratio of 20/30/50 respectively and that different amounts of $B_2O_3$ additive were used in the series (ie. 0.1%, 0.3%, and 0.6% by weight were used).

Figure 4:
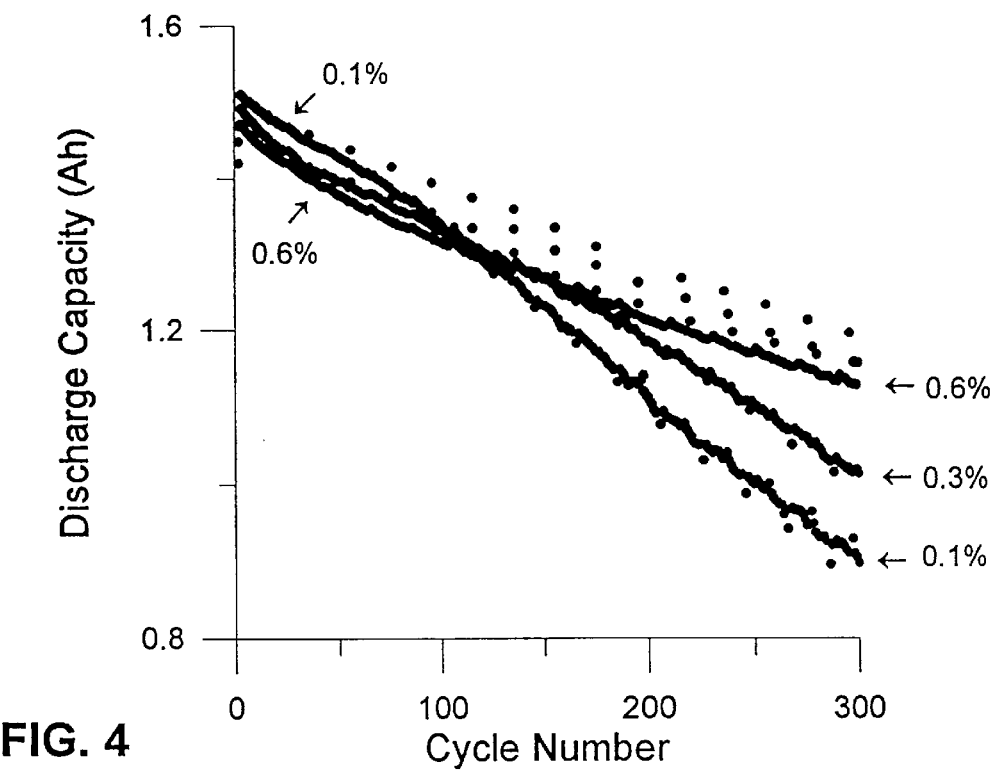
FIG. 4 shows the capacity versus cycle number data for batteries of Inventive Example 2 comprising varied weight % of $B_2O_3$ in the electrolyte.

FIG. 4 shows the capacity versus cycle number data for a representative battery with each weight amount of $B_2O_3$ additive. A definite trend is seen. Although every battery shows an improvement in capacity fade rate over that of Comparative Example 1, the more $B_2O_3$ used, the better the fade rate. However, the more $B_2O_3$ used the larger the initial irreversible loss of capacity during the conditioning step. (It should also be noted that the presence of PC itself results in a slight increase in the initial irreversible capacity loss as compared with that of batteries in Inventive Example 1.)

COMPARATIVE EXAMPLE 2

Figure 6:
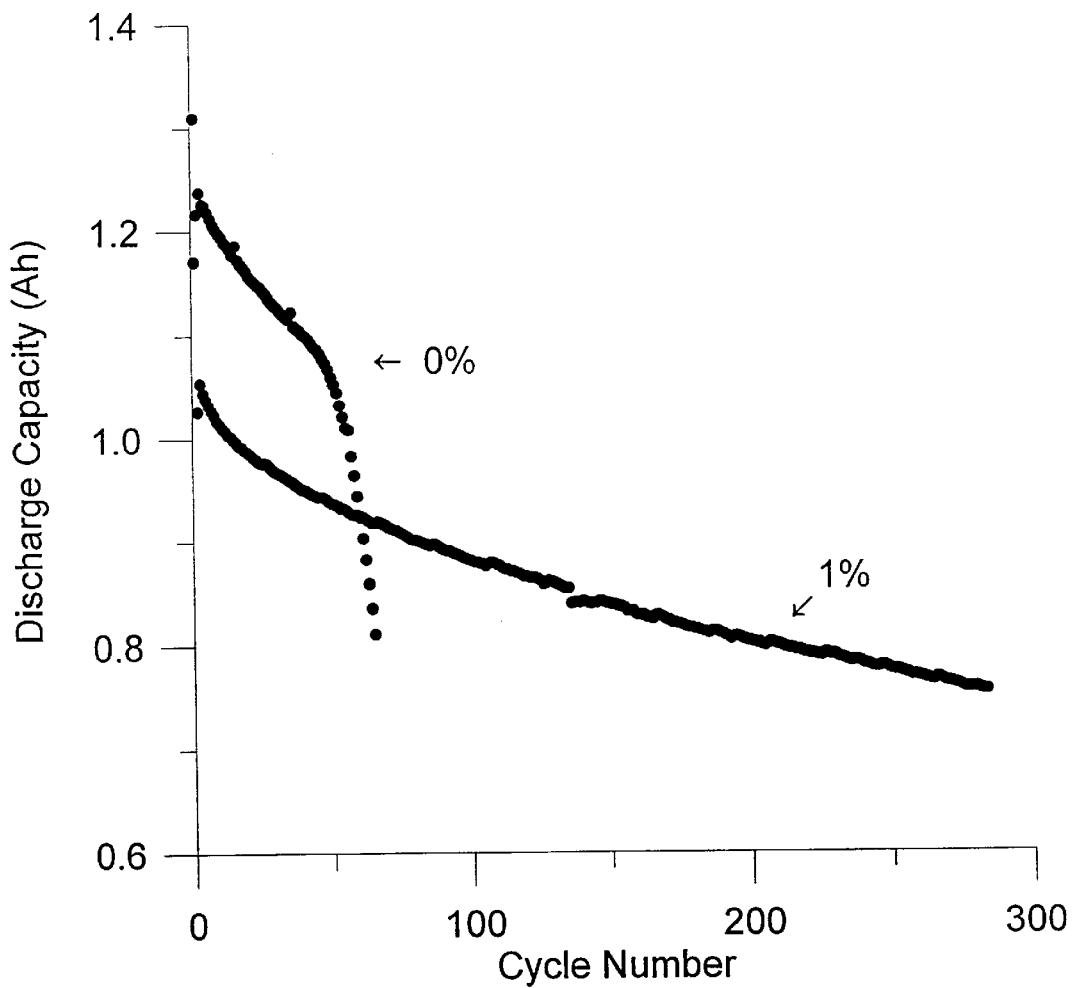
FIG. 6 shows the capacity versus cycle number data for a representative battery of Comparative Example 2 and Inventive Example 3 comprising 0% and 1% wt. $B_2O_3$ in the electrolyte respectively.

Two $LiMn_2O_4$ based 18650 batteries were constructed using an electrolyte comprising a mixture of ethylene carbonate (EC), ethyl methyl carbonate (EMC), and diethyl carbonate (DEC) solvents in a volume ratio of 30/50/20 respectively. The batteries were then cycled as described above. FIG. 6 shows the capacity versus cycle number data for a representative battery (indicated as the 0% data). As seen in this Figure, the discharge capacity decreases drastically at about cycle 50.

INVENTIVE EXAMPLE 3

Two $LiMn_2O_4$ based 18650 batteries were constructed as in Comparative Example 2 except that the electrolyte comprised 1% $B_2O_3$ by weight. The batteries were then cycled as in Comparative Example 2. FIG. 6 shows the capacity versus cycle number data for a representative battery (indicated as the 1% data). This battery does not undergo a drastic capacity loss up to at least over 250 cycles.

As before, a small increase in the irreversible loss of lithium during the first conditioning charge occurs. Apparently, the effect on the initial capacity for these $LiMn_2O_4$ based batteries is more significant than for the $LiCoO_2$ batteries.

ILLUSTRATIVE EXAMPLE

A series of $LiCoO_2$ 18650 batteries having varied amounts of $B_2O_3$ additive was prepared for thermal stability tests. Batteries were otherwise constructed as in Inventive Example 2 above except that the electrolyte additionally comprised 2% by weight biphenyl additive. (As mentioned previously, the header of these batteries may include a pressure operated electrical disconnect device which can serve to protect against hazardous conditions on overcharge of the battery. As described in co-pending Canadian Patent Application Ser. No. 2,163,187 titled 'Aromatic Monomer Gassing Agents for Protecting Non-aqueous Lithium Batteries Against Overcharge' filed Nov. 17, 1995 by the same applicant, a biphenyl additive can be employed as a gassing agent for purposes of activating the disconnect device.) The different amounts of $B_2O_3$ additive used in this series were 0%, 0.3%, 0.6%, and 1.2% by weight respectively.

The batteries were electrically conditioned, charged to 4.1V in most cases, and then exposed to a temperature of 150° C. in a convection oven (a 'hotbox' thermal stability test). Since the batteries were not heat sunk to the oven, exothermic chemical reactions can be triggered within the batteries which, in turn, can result in further heating and potential thermal runaway. The thermal response of each battery was monitored and the maximum overshoot temperature recorded. The following Table shows the results obtained. Because thermal runaway appeared to be just marginally initiated in fully charged (ie. 4.1V) batteries having 0.6% wt. $B_2O_3$ additive, another set was tested at slightly less than a fully charged state (ie. 4.04V).

| % $B_2O_3$ wt. | # of batteries | Charge voltage (V) | Maximum temperature (°C.) | Observations |
| --- | --- | --- | --- | --- |
| 0 | 2 | 4.1 | about 156 | Pressure relief opens. No smoke, sparks, or flame. |
| 0.3 | 5 | 4.1 | 156 to 160 | Pressure relief opens. No smoke, sparks, or flame. |
| 0.6 | 4 | 4.1 | >200 | 3 batteries blow off the header violently. 1 battery vents with smoke and sparks. |
| 0.6 | 5 | 4.04 | 161 to 164 | Pressure relief opens. No smoke, sparks, or flame. |
| 1.2 | 2 | 4.1 | >200 | Thermal runaway with smoke, sparks, and flame. |

Figure 5:
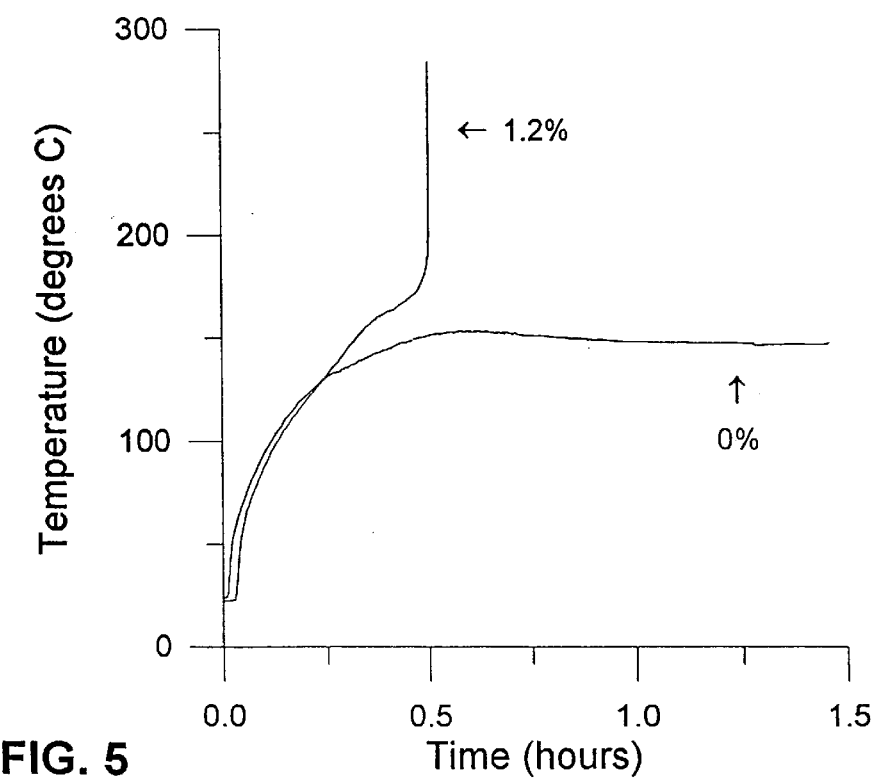
FIG. 5 shows the skin temperature versus time for the 'hotbox' testing of representative batteries having 0% and 1.2% wt. $B_2O_3$ additive in the Illustrative Example.

FIG. 5 shows the skin temperature versus time for the 'hotbox' testing of representative batteries having 0% and 1.2% $B_2O_3$ additive by weight. The latter battery starts heating up faster than the former above about 130° C. Shortly thereafter, the latter battery undergoes thermal runaway while the former overshoots the oven temperature briefly and then cools back to the oven temperature.

Thus, as demonstrated, the use of a $B_2O_3$ additive can adversely affect the thermal threshold stability of such batteries. Consequently, it is important not to use an excessive amount of $B_2O_3$ additive. In this Illustrative Example, and as indicated by the Table above, thermal runaway in a conventional 150° C. 'hotbox' test can be avoided for $LiCoO_2$ based batteries having less than about 0.6% by weight dissolved $B_2O_3$. A similar situation might be expected for batteries based on other active cathode materials and/or electrolytes.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for reducing the capacity fade rate during cycling of a non-aqueous rechargeable battery, the battery having a lithium insertion compound cathode, a lithium compound anode, and a non-aqueous electrolyte solution including a lithium salt dissolved in a non-aqueous solvent, which method comprises dissolving $B_2O_3$ in the solvent prior to assembling the battery and placing the non-aqueous electrolyte solution containing $B_2O_3$ into the battery.

2. A method as claimed in claim 1 wherein the amount of $B_2O_3$ dissolved in the solvent is sufficiently small such that the thermal stability threshold of the battery remains essentially unchanged.

3. A method as claimed in claim 1 wherein the amount of $B_2O_3$ additive dissolved in the solvent is from about 0.1% to 1.0% weight of the weight of the electrolyte.

4. A method as claimed in claim 1 wherein the amount of $B_2O_3$ additive dissolved in the solvent is from about 0.1% to less than about 0.6% weight of the weight of the electrolyte.

5. A method as claimed in claim 1 additionally comprising cooling the electrolyte during the dissolving step to prevent decomposition of the electrolyte.

6. A method as claimed in claim 5 wherein the electrolyte is cooled to about −10° C.

7. A method as claimed in claim 1 wherein the cathode comprises a lithium transition metal oxide.

8. A method as claimed in claim 7 wherein the lithium transition metal oxide is $LiCoO_2$ or $LiMn_2O_4$.

9. A method as claimed in claim 1 wherein the anode comprises a carbonaceous insertion compound.

10. A method as claimed in claim 1 wherein the lithium salt is $LiPF_6$.

11. A method as claimed in claim 1 wherein the non-aqueous solvent comprises an organic carbonate.

12. A method as claimed in claim 11 wherein the non-aqueous solvent is a mixture of ethylene carbonate, ethyl methyl carbonate, and diethyl carbonate.

13. A method as claimed in claim 11 wherein the non-aqueous solvent is a mixture of ethylene carbonate, ethyl methyl carbonate, and propylene carbonate.

14. A method for reducing the fade rate during cycling of a non-aqueous rechargeable lithium battery, the battery having a lithium insertion compound cathode, a lithium compound anode, and a non-aqueous electrolyte including a lithium salt dissolved in a non-aqueous solvent, which method comprises incorporating $B_2O_3$ additive as a dispersed powder in the anode such that the additive is accessed by and dissolved in the solvent during assembly of the battery.

15. A method as claimed in claim 14 wherein the amount of $B_2O_3$ additive accessed by and dissolved in the solvent is from about 0.1% to 1.0% weight of the weight of the electrolyte.

16. A method for reducing the fade rate during cycling of a non-aqueous rechargeable lithium battery, the battery having a lithium insertion compound cathode, a lithium compound anode, a separator, and a non-aqueous electrolyte including a lithium salt dissolved in a non-aqueous solvent, which method comprises incorporating $B_2O_3$ additive as a dispersed powder in the separator such that the additive is accessed by and dissolved in the solvent during assembly of the battery.

17. A method as claimed in claim 16 wherein the amount of $B_2O_3$ additive accessed by and dissolved in the solvent is from about 0.1 to 1.0% weight of the weight of the electrolyte.

18. A method for reducing the fade rate during cycling of a non-aqueous rechargeable lithium battery, the battery having a lithium insertion compound cathode, a lithium compound anode; and a non-aqueous electrolyte including a lithium salt dissolved in a non-aqueous solvent, which method comprises incorporating $B_2O_3$ additive as a dispersed powder at a location in the battery remote from the cathode, anode, and separator such that the additive is accessed by and dissolved in the solvent during assembly of the battery.

19. A method as claimed in claim 18 wherein the amount of $B_2O_3$ additive accessed by and dissolved in the solvent is from about 0.1% to 1.0% weight of the weight of the electrolyte.

* * * * *